Patented Jan. 29, 1929.

1,700,722

UNITED STATES PATENT OFFICE.

KARL IMHOFF, OF ESSEN, GERMANY.

SEWAGE TREATMENT BY ACTIVATED SLUDGE IN COMBINATION WITH A PRELIMINARY TANK TREATMENT.

Application filed August 25, 1924, Serial No. 734,011, and in Germany July 15, 1924.

The hitherto known methods of sewage treatment by activated sludge work mostly without preliminary tanks, because the crude sewage can be purified in the aeration tanks practically as well as sewage pre-treated in settling basins. The preliminary tank treatment is, however, of very great importance in the treatment of the sludge itself. The better the pre-cleaning, the smaller is the quantity of excess sludge afterwards produced in the aeration tanks and the lower are the costs required for a disposal of said excess sludge which can only be treated with difficulty.

Figure 1:
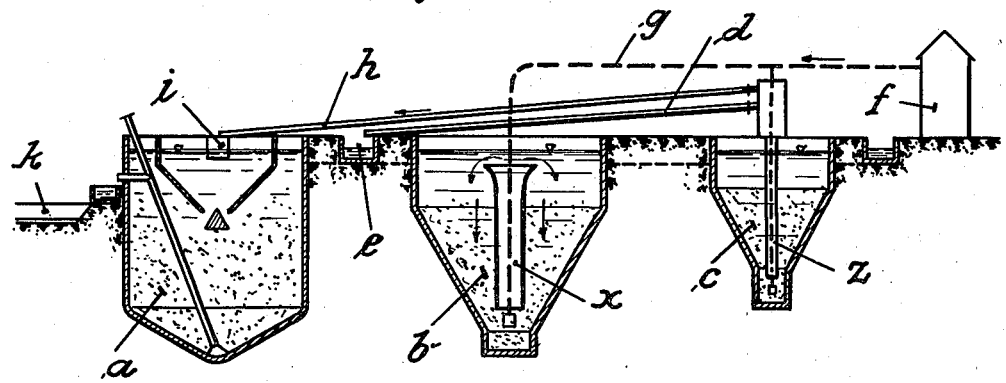
Figure 2:
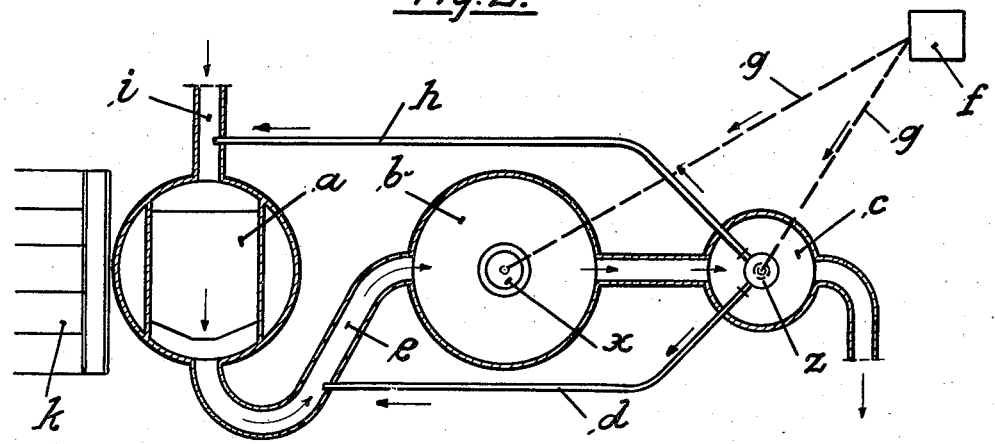

In the accompanying drawing: Figs. 1 and 2 are respectively a sectional front elevation and a plan view of a diagrammatical arrangement, in which a combined settling and digestion tank is provided for a preliminary treatment of the sewage.

The digested sludge is dried on the drying beds $k$. The discharge from the settling basin $a$ flows through the aeration tank $b$. At the bottom of the latter compressed air is supplied in a way known in the art, which aerates the activated sludge therein and raises the same in a rising pipe $x$ so that it cannot settle at the bottom. The discharge from the aeration tank $b$ flows through the hopper bottom tank $c$ which separates the activated sludge from the then purified discharge. To always have the necessary quantity of activated sludge in the aeration tank $b$, the sludge eliminated in the hopper bottom tank $c$ is continuously raised by means of compressed air in a rising pipe $z$ therein and led through a pipe $d$ into the supply conduit $e$ of the aeration tank $b$, coming from the basin $a$. This portion of the activated sludge is named: return sludge.

The compressed air required for aerating the activated sludge in the aeration tank $b$ and for raising the sludge from the hopper bottom tank $c$ is produced in the engine house $f$ and supplied through pipes $g$ to its places of destination.

Beside the return sludge, of which the quantity is always constant, on each working day a certain quantity of excess sludge is produced in the plant, which cannot be used in the aeration tank $b$ and must be removed. For this purpose, said excess sludge is led from the hopper bottom tank $c$ through a pipe $h$ to the crude sewage supply conduit $i$ of the preliminary tank or basin $a$. Thereby, the following advantages are attained: (1) The activated sludge has a high adsorptive power and sinks very quickly. By mixing it with the incoming crude sewage, it adsorbs a large portion of the very fine suspended matters therein, which otherwise do not settle in the settling basin, and sinks to the bottom with the same; thereby improving the settling action of the settling basin or preliminary tank $a$. (2) A special treatment of the sludge by reason of its high amount of moisture becomes unnecessary, this being of greatest importance. However the preliminary treatment of the sludge may be, it is always an advantage to dispose of the activated sludge together with the sludge of the preliminary tank. This applies particularly to the digestion of the sludge in digestion tanks. Wherever it has been attempted to let the activated sludge decompose alone, it was found that a very long time and very large chambers are required for this purpose. The decomposition becomes more favorable by adding to the activated sludge digested sludge from the digestion tanks of the preliminary treatment. This is attained in a most simple way by the method above proposed, that is by leading the excess sludge into the supply conduit of the preliminary tank. If, for instance, a combined settling and digestion tank $a$ (Fig. 1) is provided for the preliminary treatment of the crude sewage, the different sludge particles when settling from the sewage arrive together at the digestion tank and are there at once exposed to methane fermentation. The excess activated sludge disappears in the digestion tanks almost completely, because it consists practically of water only and of organic matters which are gasified during the digestion. Thus, the preliminary tanks need not be much larger than in conventional plants, and the quantity of methane gained is increased.

What I claim, is:

1. The method of treating sewage which comprises passing the sewage through a preliminary settling tank, next conducting the sewage to an aeration tank, then passing the sewage through a sedimentation and separation tank and returning activated sludge from the last-named tank to the preliminary tank.

2. The method of treating sewage which comprises passing the sewage through a preliminary or settling tank, conducting the sewage next to an aeration tank, and then through a sedimentation and separation tank, and returning activated sludge from the sedimentation tank to the preliminary settling tank and the aeration tank.

3. The method of sewage treatment by activated sludge in passing the sewage successively through a preliminary or settling tank, an activation and aeration tank and a separation and sedimentation tank which consists in activating the sewage and the sludge and introducing air into the activated sludge aeration tank; separating and sedimenting the sludge in the separating tank; returning a part of the separated activated sludge from the separation tank into the aeration tanks; and returning another part of the separated activated sludge from the separation tank into the preliminary tank.

4. A plant for carrying through sewage treatment by activated sludge, comprising in combination a preliminary tank adapted for carrying through a preliminary settling of the sewage and digesting of the sludge; an intermediate tank adapted for carrying through the inoculation and the activation of the sewage and the sludge; a tank adapted for carrying through the separation of the activated sludge from the purified remainder of the product; conduits between the different tanks for passing the sludge through them in the before mentioned order; means for activating and for aerating the sludge in the intermediate or aerating tank; means for returning the so called return activated sludge from the separation tank into the aeration tank; and means for returning the so called excess activated sludge from the separation tank into settling and digesting tank.

In testimony whereof I have hereunto set my hand.

KARL IMHOFF.